United States Patent
Durack

(10) Patent No.: US 10,473,196 B2
(45) Date of Patent: Nov. 12, 2019

(54) TOROIDAL VARIABLE SPEED TRACTION DRIVE

(75) Inventor: Michael James Durack, Toowoomba (AU)

(73) Assignee: ULTIMATE TRANSMISSIONS PTY LTD., Strathfield, NSW (AU)

( * ) Notice: Subject to any disclaimer, the term of this patent is extended or adjusted under 35 U.S.C. 154(b) by 1044 days.

(21) Appl. No.: 14/115,543

(22) PCT Filed: May 4, 2012

(86) PCT No.: PCT/AU2012/000476
§ 371 (c)(1),
(2), (4) Date: Jan. 22, 2014

(87) PCT Pub. No.: WO2012/151615
PCT Pub. Date: Nov. 15, 2012

(65) Prior Publication Data
US 2014/0135167 A1 May 15, 2014

(30) Foreign Application Priority Data
May 6, 2011 (AU) .................................. 2011901690

(51) Int. Cl.
*F16H 15/38* (2006.01)
*F16H 15/04* (2006.01)
*F16H 63/06* (2006.01)

(52) U.S. Cl.
CPC .............. *F16H 15/04* (2013.01); *F16H 15/38* (2013.01); *F16H 63/065* (2013.01); *F16H 2015/383* (2013.01)

(58) Field of Classification Search
CPC ......... F16H 15/04; F16H 15/38; F16H 63/065
(Continued)

(56) References Cited

U.S. PATENT DOCUMENTS

| 2,016,248 A | 10/1935 | Schmitter |
| 2,039,288 A * | 5/1936 | Austin .................... F16H 15/38 476/42 |

(Continued)

FOREIGN PATENT DOCUMENTS

| FR | 796188 | * | 3/1936 |
| WO | 1990004729 | | 5/1990 |
| WO | 2011041851 | | 4/2011 |

OTHER PUBLICATIONS

International Search Report dated Jun. 29, 2012 in PCT Application No. PCT/AU2012/000476. (3 pages).

*Primary Examiner* — William C Joyce
(74) *Attorney, Agent, or Firm* — Shutts & Bowen LLP

(57) ABSTRACT

A toroidal variable speed traction drive includes a driving disc and a driven disc. The discs have a common axis of rotation. The inner face of each disc is formed with a negative shape of a toroid. The drive further includes a plurality of roller assemblies interposed between the discs each roller assembly including a roller. The discs are urged together against the interposed roller assemblies by a clamping force. Each roller assembly is connected to a corresponding rotatable trunnion. The trunnion applies a steering force to the corresponding roller assembly at a point relative to the corresponding roller assembly; the applied steering force causing the roller of the corresponding roller assembly to steer and adopt different contact points. The point at which the steering force is applied is located offset from the trunnion rotational axis at a fixed distance.

11 Claims, 11 Drawing Sheets

(58) Field of Classification Search
USPC .............................................. 476/40, 42, 46
See application file for complete search history.

(56) References Cited

U.S. PATENT DOCUMENTS

| | | | |
|---|---|---|---|
| 2,130,314 A | | 9/1938 | Brown |
| 2,595,367 A | * | 5/1952 | Picanol .................. F16H 15/38 476/40 |
| 3,345,882 A | | 10/1967 | Armstrong |
| 5,989,150 A | | 11/1999 | Yamamoto |
| 6,866,609 B2 | | 3/2005 | Ervin |
| 2008/0009387 A1 | | 1/2008 | Nishii et al. |
| 2008/0254933 A1 | | 10/2008 | Dutson |

* cited by examiner

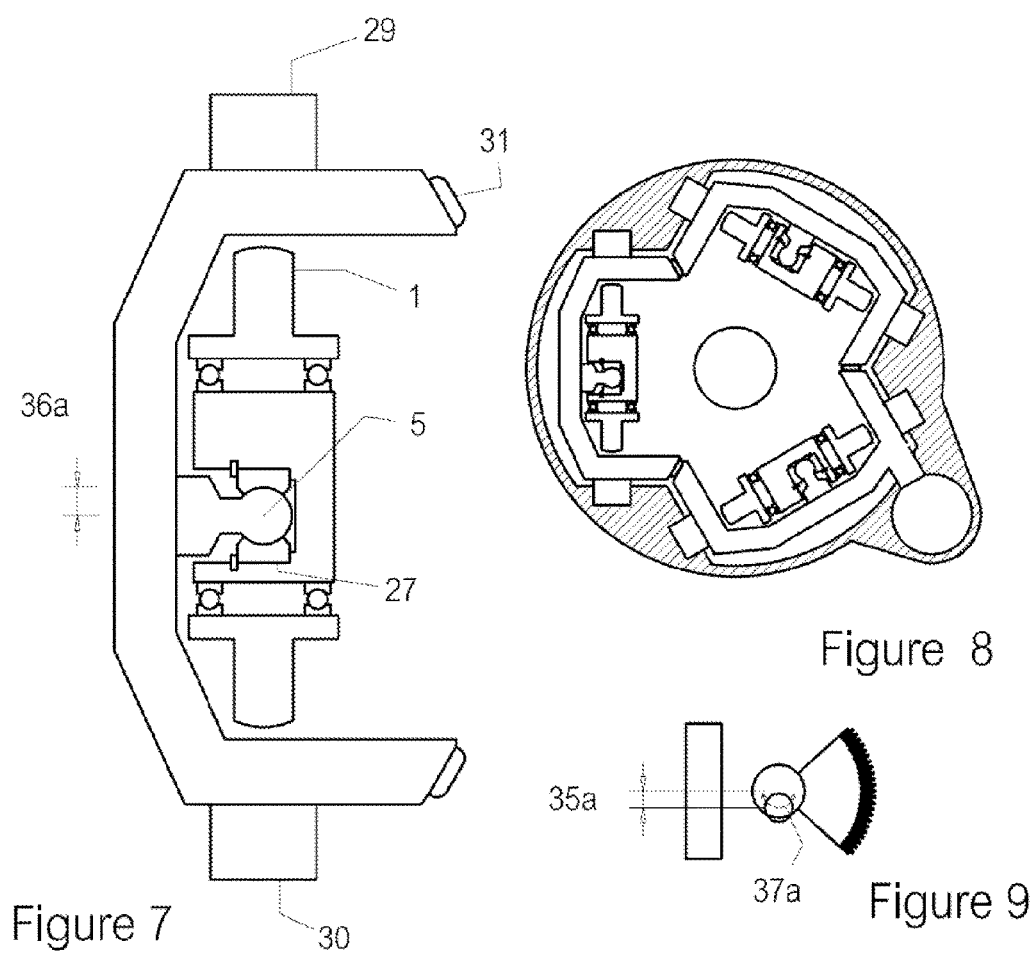

TOROIDAL VARIABLE SPEED TRACTION DRIVE

CROSS REFERENCE TO RELATED APPLICATIONS

This application is a § 371 national stage entry of International Application No. PCT/AU2012/000476, filed May 4, 2012, which claims priority to Australian Patent Application No. 2011901690 filed May 6, 2011, both of which are hereby incorporated by reference.

TECHNICAL FIELD

The present invention relates to Continuously Variable Transmissions, particularly of the Full Toroidal Race Rolling Traction Drive type with particular reference to the methods and arrangements for changing the ratio by roller steering.

BACKGROUND OF THE INVENTION

There are several Constantly Variable Transmissions (CVTs) that are being successfully designed and manufactured as transmissions for vehicles and other machines that require changing gear ratios.

The market is supplied generally by Hydro-mechanical CVT's and traction based CVT's.

Two major types of traction drives are used, although there are also many other proposals. One uses a belt running between adjustable pulley sheaves and the other a roller that runs between two discs with the negative shape of a toroid machined into it, generally called toroidal variators.

This invention is related to toroidal variators and the control of the rollers within them.

The toroidal drive market is dominated by two similar types of mechanism. One is generally called a Single Roller Half Toroidal Variator (SHTV) and the other a Single Roller Full Toroidal Variator (SFTV). A new design subject to International PCT Application No. PCT/AU2010/001331 called Double Roller Full Toroidal Variator (DFTV) is being developed which uses two rollers running against each other.

Both the SFTV and SHTV drives involve the use of twin discs that are machined with the negative shape of a toroid in opposing faces. Between the discs are rollers that roll against the surface of both toroidal cavities and can transfer force and power from one disc to the other. In the case of the Double Roller Full Toroidal drive the rollers are in pairs with one roller running against the other.

A special fluid called traction fluid is used for the actual force transfer. This fluid has the ability to become extremely viscous (almost solid) as it is squeezed between the rollers and the discs. Its ability to transfer force is determined by its "traction coefficient" which is similar to a static friction coefficient.

These rollers can be rotated or steered so that they contact the discs in different places and in so doing can change gear ratio in a seamless manner as they move.

In a SFTV drive the rollers centre of rotation is located on the centre of the toroidal cavity. In a SHTV drive the rollers are located off the centre of the toroid towards the centre of rotation of the toroid.

Both types use different methods of rotating the rollers to produce a ratio change. Generally they use a control pressure acting against the torque reaction force coming off the rollers. In this way the rollers are said to be torque controlled as distinct from ratio controlled.

The control pressure, if greater than the reaction torque, will move the rollers in one direction; if less, the rollers will move in the opposite direction. The movement of the rollers can be arranged to run against a cam restraint or similar arrangement and so rotate the rollers to produce a new ratio.

This type of control is described in US patent application no. 2008/0254933 A1 (Oct. 16 2008 inventor Brian Joseph Dutson), U.S. Pat. No. 5,989,150 (Nov. 23 1999 assignee Jatco Corporation) and US patent application no. 2008/0009387 A1 (Jan. 10 2008 assignee NSK Ltd.). The disclosures of which are incorporated herein by way of reference.

In some mechanisms the rollers are controlled individually (Jatco) while in others (Dutson and NSK) they are ganged together.

In most cases the toroidal discs are clamped with a clamping force that is proportional to the torque being transferred and a friction constant called the traction coefficient. Normally two toroidal cavities are provided with the input being provided by the two outside discs and the output coming off from the side using gears or chains. In this way there is no unsupported rotating force and no thrust bearing provided to support it.

Most toroidal drives use a method of roller steering, which is incorporated in the torque reaction support system to cause the rollers to move from one ratio to another. In this way very little force is actually applied to the roller to rotate it from one position to another. It must be understood that when the rollers are clamped between the discs with a large force it is not practical to simply slide them across the face of the discs in order to create a new ratio.

In a SFTV or SHTV this roller steering effect is accomplished using a roller support method in which the torque reaction force from the roller bears on a piston whose centre passes generally through a tangent of the centre of the toroidal cavity. When the piston pushes the roller forward or the roller moves back against the piston, the centre of rotation of the roller ceases to pass through the centre of rotation of the discs. It is immediately subjected to sideways forces acting in opposite directions on each disc and the roller rotates. This is usually referred to as roller steering and it is responsible for the ratio change responsiveness of this type of CVT.

FIGS. 1 and 2 shows three rollers 1 mounted between Full Toroidal Variator discs. The output disc 10 is clamped (not shown) onto the input disc 11. The input disc 11 is driven by the input shaft 12 while the output disc 10 drives shaft 13. The rollers 1 are provided with an axle 2 that runs on bearings 3. The bearings 3 are held in a yoke-like mounting 4.

The yoke 4 is connected to a piston 7 via a ball joint connection 5, 6 and shaft 9. The piston 7 runs inside an hydraulic cylinder 8. Two chambers 14, 15 can be supplied with high pressure oil to balance the torque reaction force coming off the roller 1. Although the discs always rotate in the same direction the torque reaction force can act in both directions depending on the state (accelerating or decelerating) of the mechanism being driven.

The cylinder 8 is mounted in a position where its centre axis passes generally through the centre of the toroidal cavity and is generally tangential to the circle defined by the centre of this cavity. It does, however, not lie exactly in a plane parallel to the plane of rotation of the discs but is inclined at an angle to this plane according to the castor angle 16.

It can be seen that the input and output discs 10, 11 and associated shafts 12, 13 rotate in opposite directions.

It can be seen that when in a steady state the axis of rotation of the roller 1 passes through the axis of rotation of the discs 10, 11. If the roller 1 moves forward or backward under the influence of the forces on it the axis of its rotation will no longer pass through the centre of rotation of the discs 10, 11 and it will be subject to steering forces that rotate it into a new ratio position.

This simultaneous mechanical action is brought about by the castor angle. As the roller 1 rotates under the influence of the steering forces its ball joint connection 5, 6 swings outward causing its rotational axis to coincide with the rotational centre of the discs 10, 11. When this occurs the steering action ceases and the roller 1 settles in a stable position, provided the roller reaction force and the control force are balanced.

The Half Toroid designs operate a similar arrangement but for other mechanical reasons cannot use a castor angle. Roller stability, after a steering movement, is achieved by allowing the roller 1 to move back to a central position by readjusting the control pressure that is reacting against the roller reaction. A stepper motor and cam recognizes where the roller 1 is and makes continuous adjustments to the control pressures using a feedback loop. Feedback loops are always subject to over-running targets resulting in oscillations or hunting. Complex dampening systems are often required to eliminate such oscillations that are unacceptable in most transmission applications.

In these prior art examples, all the rollers 1 are free to adopt independent ratio positions. However the positions that they do adopt are generally positions where they are all experiencing the same torque reaction force, as it is balanced against equal sized pistons 9 all subject to the same hydraulic fluid pressure. This balanced positioning is intended to ensure that all rollers 1 share an equal amount of the transmitted power. It is not theoretically possible for the rollers 1 to be out of ratio position because of this. However the inherent flexibility of the hydraulic fluids and the galleries in which it runs can cause oscillations that are difficult to dampen.

Other problems exist with this form of roller position control. Firstly, because the rollers 1 are supported on a force provided by an active hydraulic system, energy is continuously needed to provide the hydraulic pressure. The active hydraulic system must be large enough to move the rollers 1 quickly and so the size of the system becomes quite substantial requiring a power level that can often be 2%-4% of the energy passing through the CVT.

There are a large number of precision parts associated with the support system and the hydraulic controls associated with the hydraulic system.

There are mechanical constraints that limit the angle through which the rollers 1 can turn. This limits the overall ratio spread. Typically the maximum ratio spread for a SFTV is 6:1. It also limits the distance that the roller centre can be located from the disc axis of rotation, which in turn decreases its efficiency.

Another approach to the need to "steer" rollers to new ratios is described in U.S. Pat. No. 6,866,609 applied to a SHTV.

It is an aim of this invention to provide a control mechanism that controls the position of the rollers mechanically without the need for hydraulics and in a way that allows them to steer to new ratios without requiring a high level of force.

It is a further aim to create a control mechanism that accurately gangs together all of the rollers so that they adopt new ratios without any possibility of elastically induced oscillations.

It is a further aim of this invention to reduce the energy lost in the roller actuation system.

It is a further aim of the invention to improve the efficiency of the variator by locating the roller centre further from the disc rotational axis so that the degree of differential velocity at the contact points is lessened.

It is a further aim of the invention to increase the ratio spread of the variator by enabling the rollers to rotate through a greater angle creating a larger difference in the distance of the contact points from the disks rotational axis.

It is a further aim of the invention to increase the number of rollers that can be arranged within the toroidal cavity by creating a larger difference in the distance of the contact points from the disks rotational axis.

SUMMARY OF THE INVENTION

According to a first aspect of the present invention there is provided a toroidal variable speed traction drive comprising: a driving disc and a driven disc, said discs having a common axis of rotation, the inner face of each disc being formed with a negative shape of a toroid; a plurality of roller assemblies interposed between said discs, each roller assembly comprising a roller; wherein said discs are urged together against the interposed roller assemblies by a clamping force, wherein each roller of each roller assembly contacts each disc at contact points; each roller assembly being connected to a corresponding rotatable trunnion; each trunnion having a rotational axis which passes through a toroidal cavity formed by the opposing shaped inner faces of the discs; wherein by rotating a trunnion about the trunnion rotational axis the trunnion applies a steering force to the corresponding roller assembly at a point relative to the corresponding roller assembly; the applied steering force causing the roller of the corresponding roller assembly to steer and adopt different contact points; wherein the point at which the steering force is applied is located offset from the trunnion rotational axis at a fixed distance and also located offset a line which intersects the contact points.

According to a further aspect of the present invention there is provided a toroidal variable speed traction drive comprising: a driving disc and a driven disc, said discs having a common axis of rotation, the inner face of each disc being formed with a negative shape of a toroid; a plurality of pairs of roller assemblies interposed between said discs, each roller assembly comprising a roller; wherein said discs are urged together against the interposed pairs of roller assemblies by a clamping force, wherein the pair of rollers of each pair of roller assemblies are arranged to roll on each other with one roller contacting the driving disc at a first contact point and the other roller contacting the driven disc at a second contact point; each roller assembly of each pair of roller assemblies being connected to a corresponding rotatable trunnion; each trunnion having a rotational axis which passes through a toroidal cavity formed by the opposing shaped inner faces of the discs; wherein by rotating a trunnion about the trunnion rotational axis the trunnion applies a steering force to the corresponding pair of roller assemblies at respective points relative to each roller assembly of the pair; the applied steering force causing the rollers of the corresponding pair of roller assemblies to steer and adopt different first and second contact points; each respective point at which the steering force is applied is located offset from the trunnion rotational axis at a fixed distance and also located offset a line which intersects the first and second contact points.

BRIEF DESCRIPTION OF THE DRAWINGS

Preferred embodiments of the invention will now be described with reference to the drawings, in which:

FIG. 7 shows an alternative embodiment version of a trunnion and roller assembly in isolation;

FIG. 8 shows a top plan schematic view of a toroidal variator according to an alternative embodiment of the present invention, incorporating the trunnion and roller assembly of FIG. 7;

FIG. 9 is a side schematic view of the trunnion of FIG. 7;

DETAILED DESCRIPTION OF THE INVENTION

In a first particular embodiment of the invention three single rollers are arranged within a typical toroidal cavity as with the previously mentioned prior art.

Figure 1:
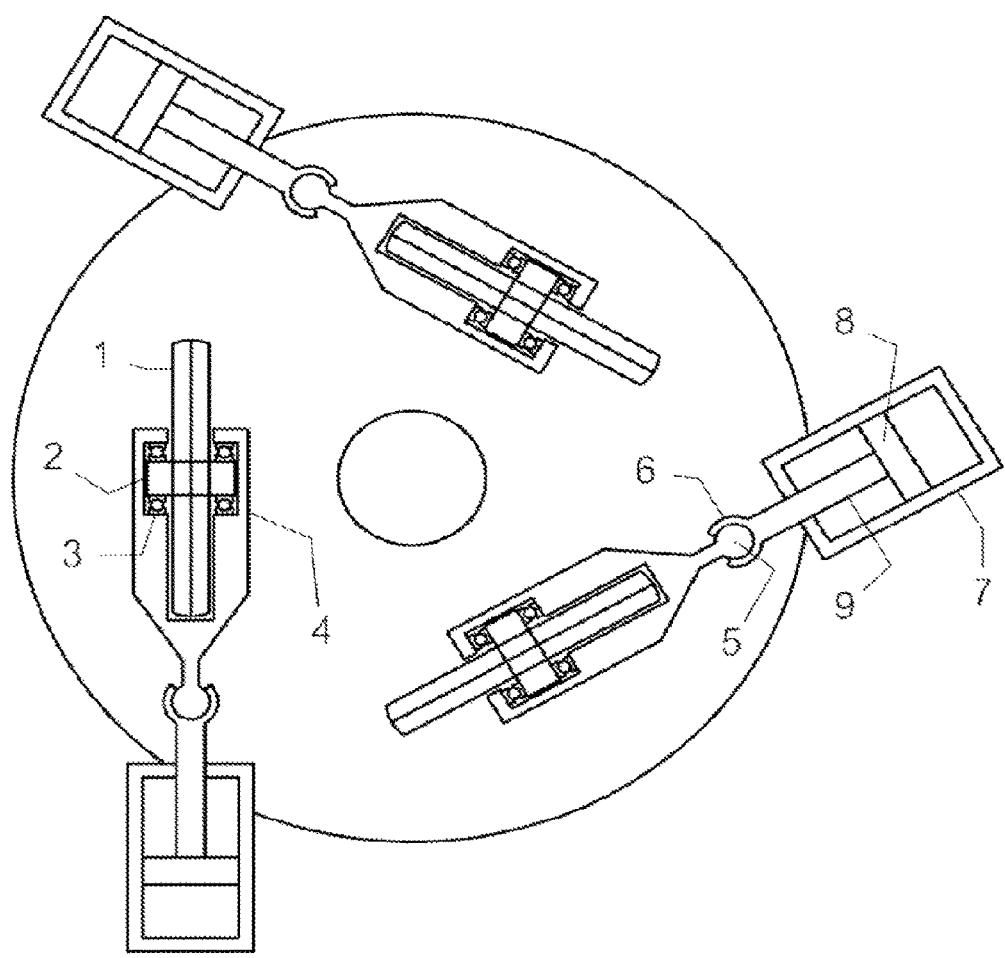
FIG. 1 shows a top plan schematic view of an example of a prior art toroidal variator.
Figure 2:
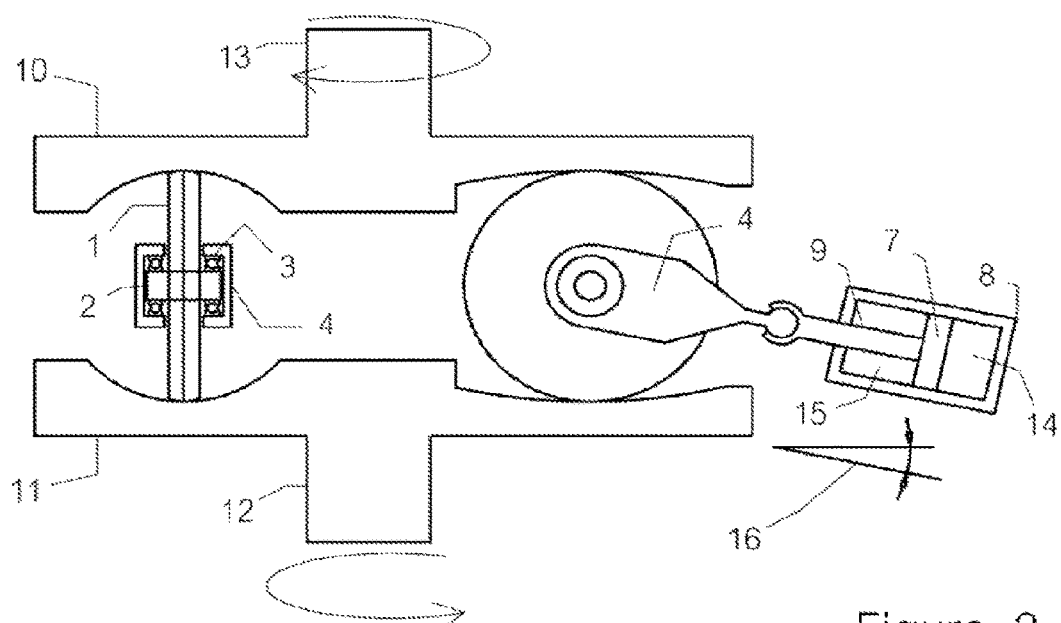
FIG. 2 shows of a side view of the prior art variator of FIG. 1.
Figure 3:
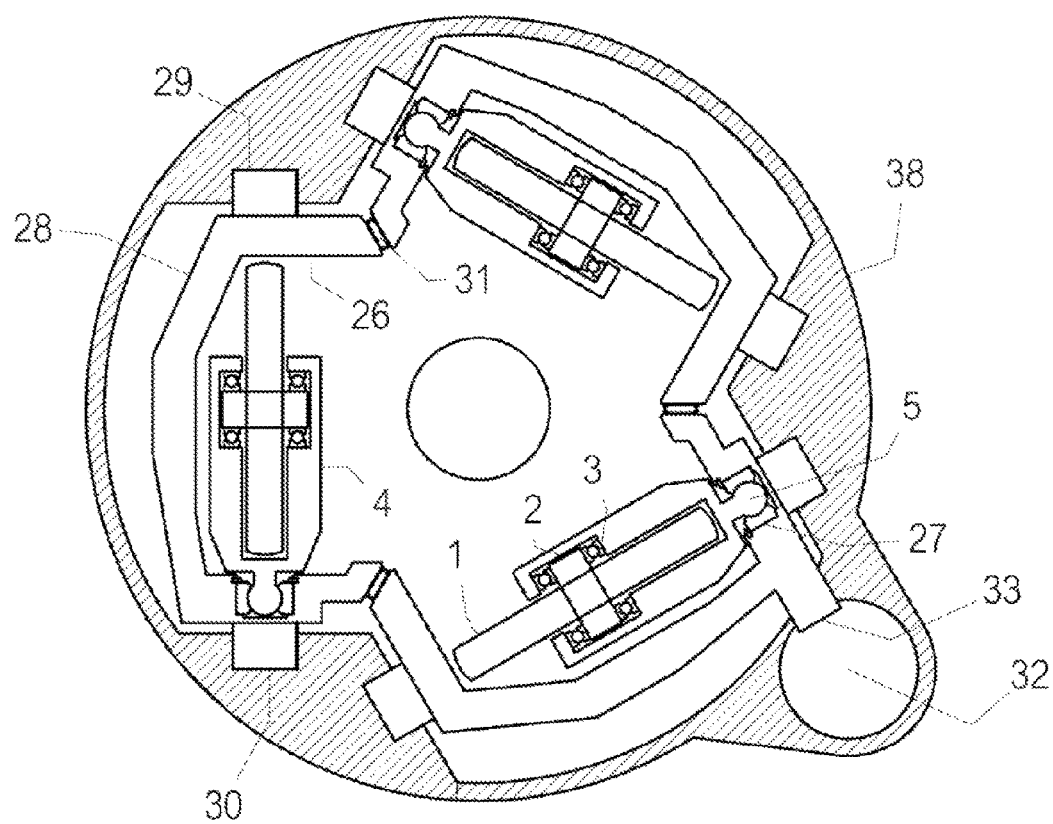
FIG. 3 shows a top plan schematic view of a toroidal variator according to a first embodiment of the present invention.

FIG. 3 shows a plan view of such an arrangement in which the rollers 1 are mounted on an axle 2 on bearings 3 and held in a yoke 4, as before. At one end of the yoke is a ball 5 that is captured inside a ball enclosure 27. The ball enclosure is mounted inside one end of a trunnion 28.

The trunnion 28 is formed at each end with an axle 29 and 30 which is mounted within a body enclosure 38 so that the trunnion 28 is free to rotate. The centre axis of the trunnion 28 passes through the centre of the toroidal cavity.

It can readily be seen that there is no mechanical restraint on the angle through which the roller 1 can rotate to create different ratios. For this reason it is possible to create ratio spreads of over 20:1. Also for this reason it is possible to place the rollers 1 a large distance from the central axis while maintaining an acceptable ratio allowing the design to be capable of incorporating four rollers, which also operate more efficiently.

The trunnions 28 are fitted with a projection 26 fitted with meshing gears 31 so that each trunnion 28 must rotate on its supporting axles 29, 30 in conformity with the other two trunnions.

One of the trunnions is also fitted with another gear 33 that can be rotated by a rack gear (or similar actuator) located within an actuator 32.

Figure 4:
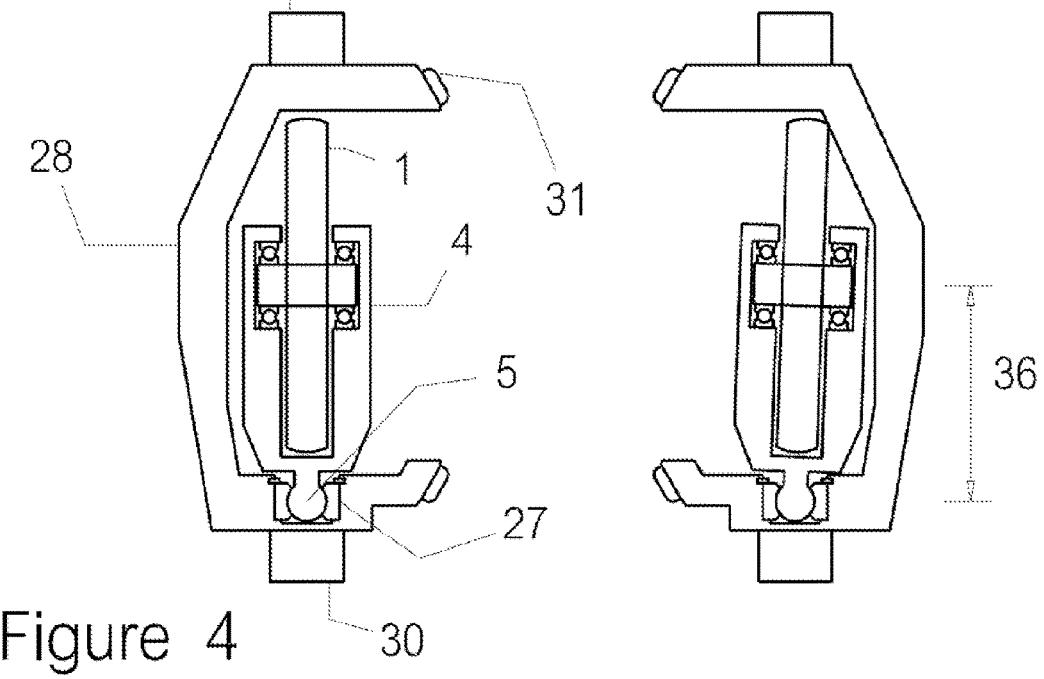
FIG. 4 shows schematic views of two trunnion and roller assemblies of the variator of FIG. 3 in isolation.

FIG. 4 depicts two trunnions removed from the casing with trunnion body 28 projecting axles 29 and 30, gears 31, ball 5 and ball enclosure 27 clearly shown.

The yoke 4 supporting the roller 1 is free to rotate on the ball 5 and ball enclosure 27 so that the roller 1 can steer itself within the toroidal cavity. In other words, the roller assembly can reorientate with respect to the trunnion about the ball 5. The trunnion on the right side of FIG. 4 shows the roller 1 turned 1.2 degrees.

Figure 5:
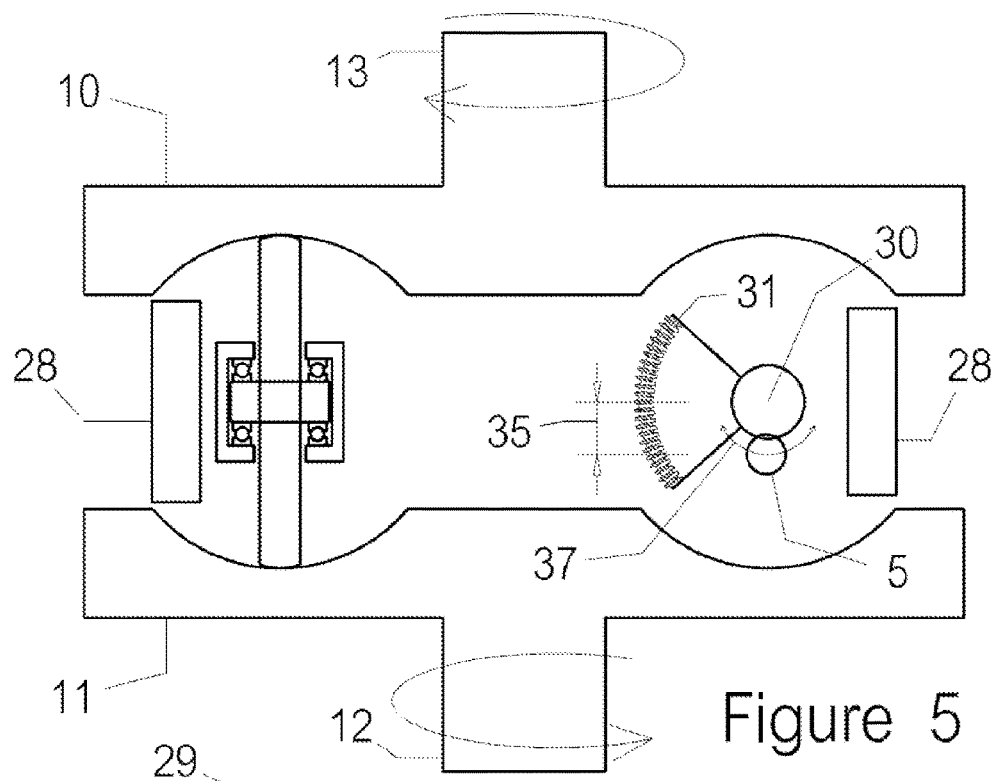
FIG. 5 shows a side schematic view of the variator of FIG. 3.

FIG. 5 shows a diagrammatic section through the toroidal cavity. On the left the section passes through the centre of the roller 1 and the trunnion body 28 with the roller 1 in the central or 1:1 position held between the input and output discs 10, 11.

On the right is a diagrammatic end view of the trunnion 28 showing the end of the axle 30, a side view of the gears 31, the trunnion body 28 and the location of the ball 5 offset from the axle 30 by the castor offset 35.

When the trunnion 28 is rotated around its axis the centre of the ball 5 will describe an arc 37. The ball enclosure 27 connected to the yoke 4 must follow the ball 5 and in so doing turns the roller 1 which causes it to steer. The amount it steers is a function of the degree of rotation of the trunnion 28 and the relative size of the castor offset 35 and the steering offset 36.

If the rotation of the trunnion 28 is clockwise (as viewed in FIG. 4) and the input disc 11 is rotating as shown, the roller 1 is urged towards a lower gear with the input contact point moving closer to the central rotation axis. As well as being urged in that direction it is turned by the movement of the ball 5 under the influence of the castor offset 35 and the steering offset 36 to steer towards the centre. At the output contact point, the steering is towards the outside because the rotation of the disc 10 is reversed.

When the roller rotation "catches up" with the trunnion rotation the steering action reduces to zero with the roller 1 again being in a position where the centre of its axis of rotation passes through the main axis.

If the trunnion 28 is rotated in the opposite direction the reverse will happen.

The steering action is now directly associated with the rotation of the trunnion 28. The roller 1 is not forced to adopt a new ratio position which would require a large twisting force on the roller 1 but it is steered to one.

Figure 6:
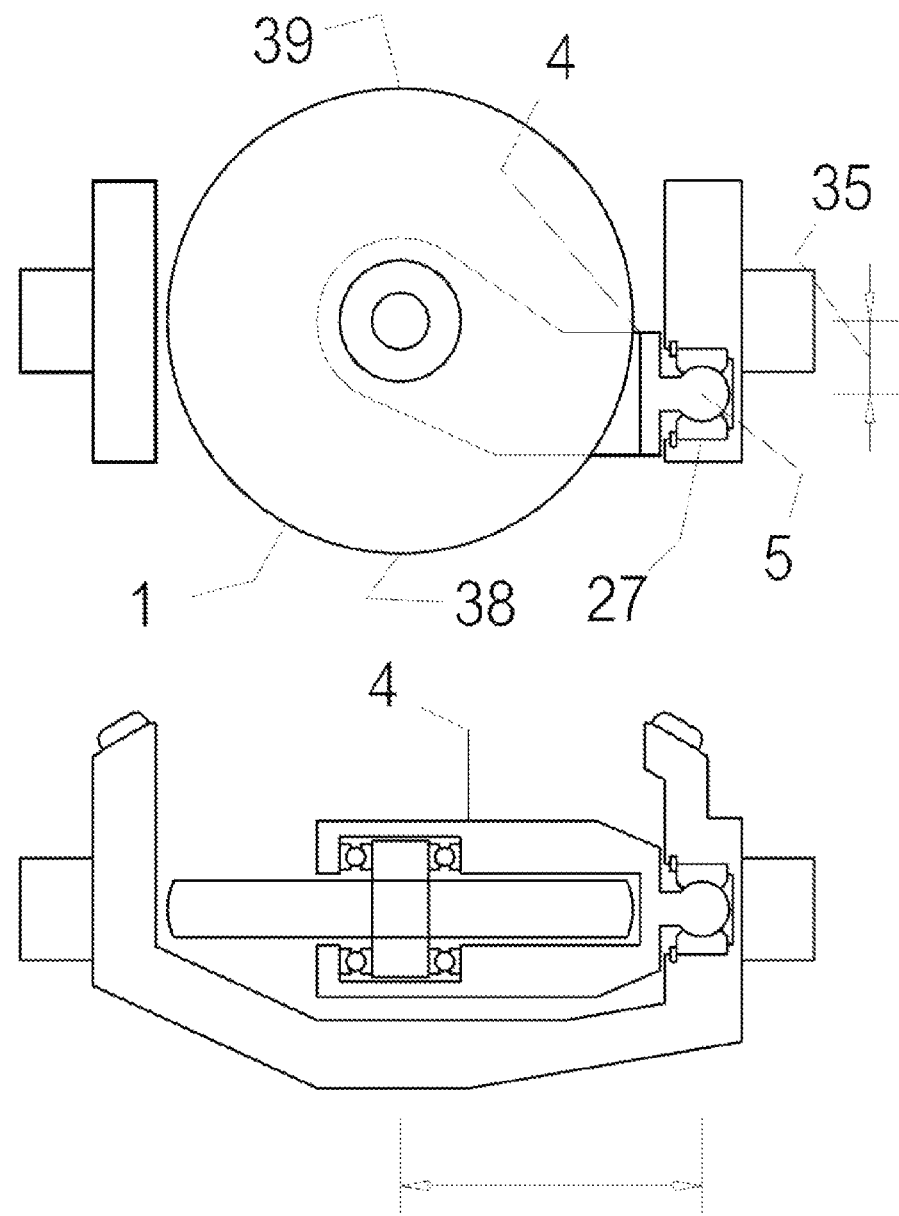
FIG. 6 shows a top and side view of a trunnion and roller assembly of the variator of FIG. 3 in isolation.

FIG. 6 shows the relationship of the castor offset 35 and castor displacement 36 from a different viewpoint.

The points 38, 39 on the roller 1 represent the input and output contacts. Although the discs 10, 11 and the rollers 1 are rotating, these points are fixed in space and the roller 1 cannot be displaced from them without some applied force. However if the roller turns (steered) then 38 will move one way and 39 the other.

In this type of arrangement in a typical drive with an internal diameter of 100 mm. running at 1,000 RPM input, a steering angle of 2 degrees will cause the roller to sweep from high gear to low gear in less than 0.25 of a second.

FIGS. 7, 8 and 9 show another arrangement of castor offset and castor displacement in which the castor displacement 36a is brought inside and becomes relative in size to the castor offset 35a.

The roller 1 is now mounted on a larger diameter bearing which encloses a housing containing the ball 5 and the ball enclosure 27.

The ball 5 is now mounted directly on to the trunnion 28.

This is a more compact mechanism but one that requires greater mechanical accuracy to ensure that each roller 1 maintains the same relative position within the toroidal cavity as the other rollers.

Figure 14:
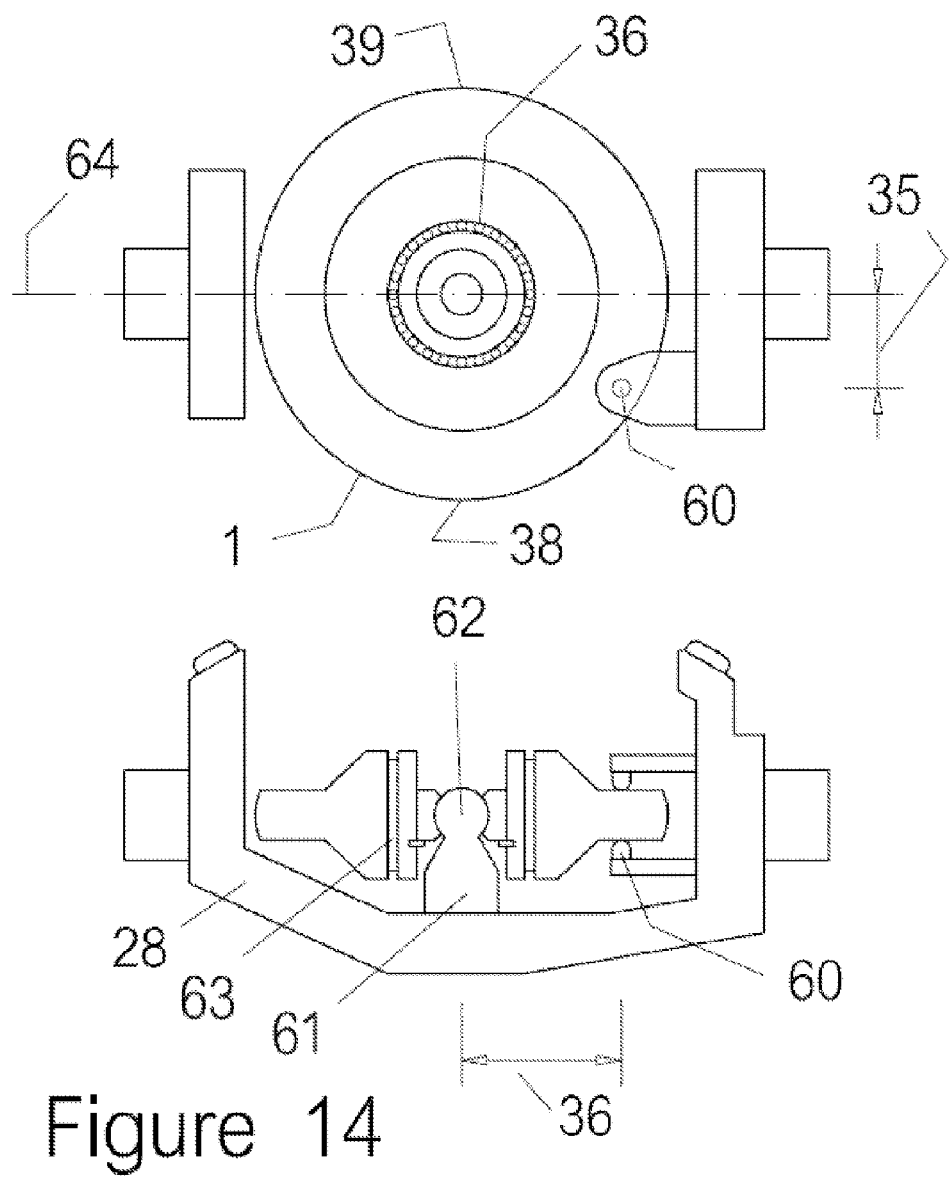
FIG. 14 shows views of an alternative embodiment version of a trunnion and roller assembly in isolation.

FIG. 14 shows a further alternative arrangement. In this alternative arrangement the trunnion 28 includes a double-sided offset steering cam 60 that acts directly on the outer edge of the roller 1 when the trunnion 28 is rotated. The roller 1 in this case is rotatably mounted on a bearing 63. The bearing 63 is supported at it's rotational axis on a ball joint 62. The ball joint 62 being fixed mounted to the trunnion 28 on a projection 61. Again, the roller assembly can reorientate with respect to the trunnion 28 about the ball joint 62. As the trunnion 28 is rotated about its axis 64, the steering cam 60 contacts the roller 1 at a point that is offset (the steering offset 36) from the line that intersects the roller contact points 38, 39 and offset from the trunnion's rotational axis 64 (the castor offset 35), thereby steering the roller 1.

In another preferred embodiment the combination of trunnion, yoke, and offset ball joint is applied to the Double Roller Full Toroidal Variator as described in International PCT Application No. PCT/AU2010/001331, the disclosure of which is incorporated herein by way of reference.

In this design a pair of rollers 40 is placed inside the toroidal cavity with the rollers 40 having a toroidal surface on which they roll on the toroidal surface of the discs and a conical surface on which they roll on each other.

Figure 10:
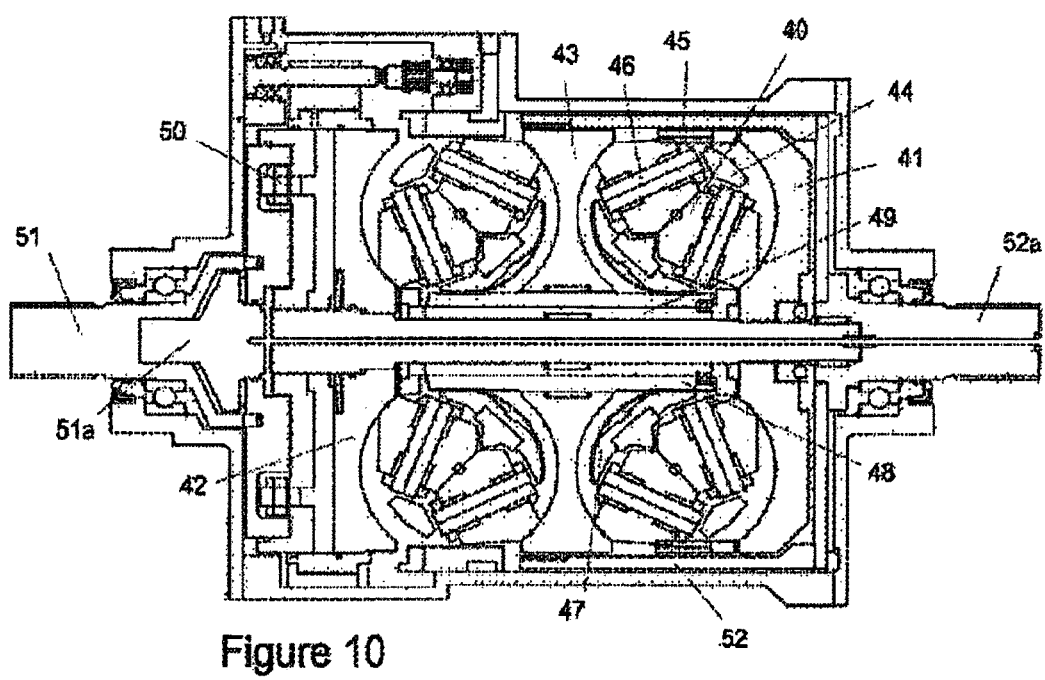
FIG. 10 is a schematic view of an alternative embodiment of a variator employing roller pairs.

FIG. 10 depicts a section through such an embodiment.

The double rollers 40 including a toroidal surface rolling on the input discs 41 and 42 and paired output discs 43 with a conical surface rolling on each other. The rollers are supported on axles 46 which pass through yokes 45 which are connected via an articulated joint to the trunnions 44.

Figure 12:
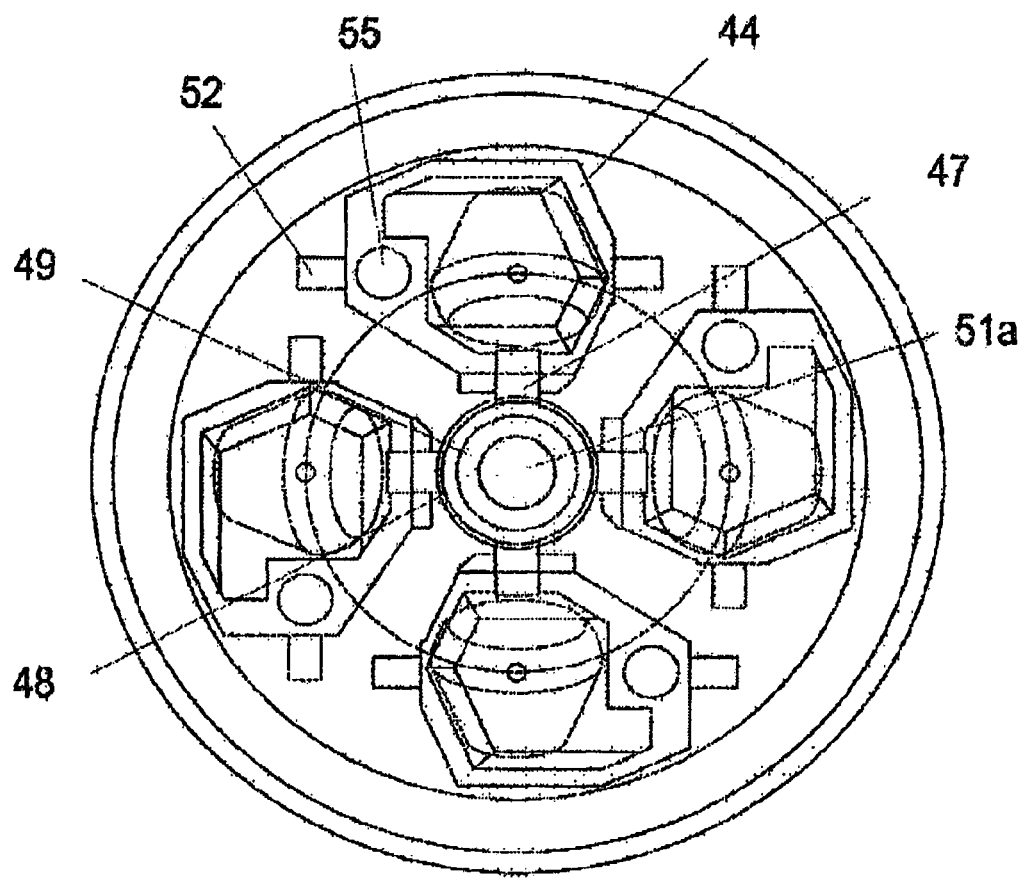
FIG. 12 is a top plan schematic view of the variator of FIG. 10.
Figure 13:
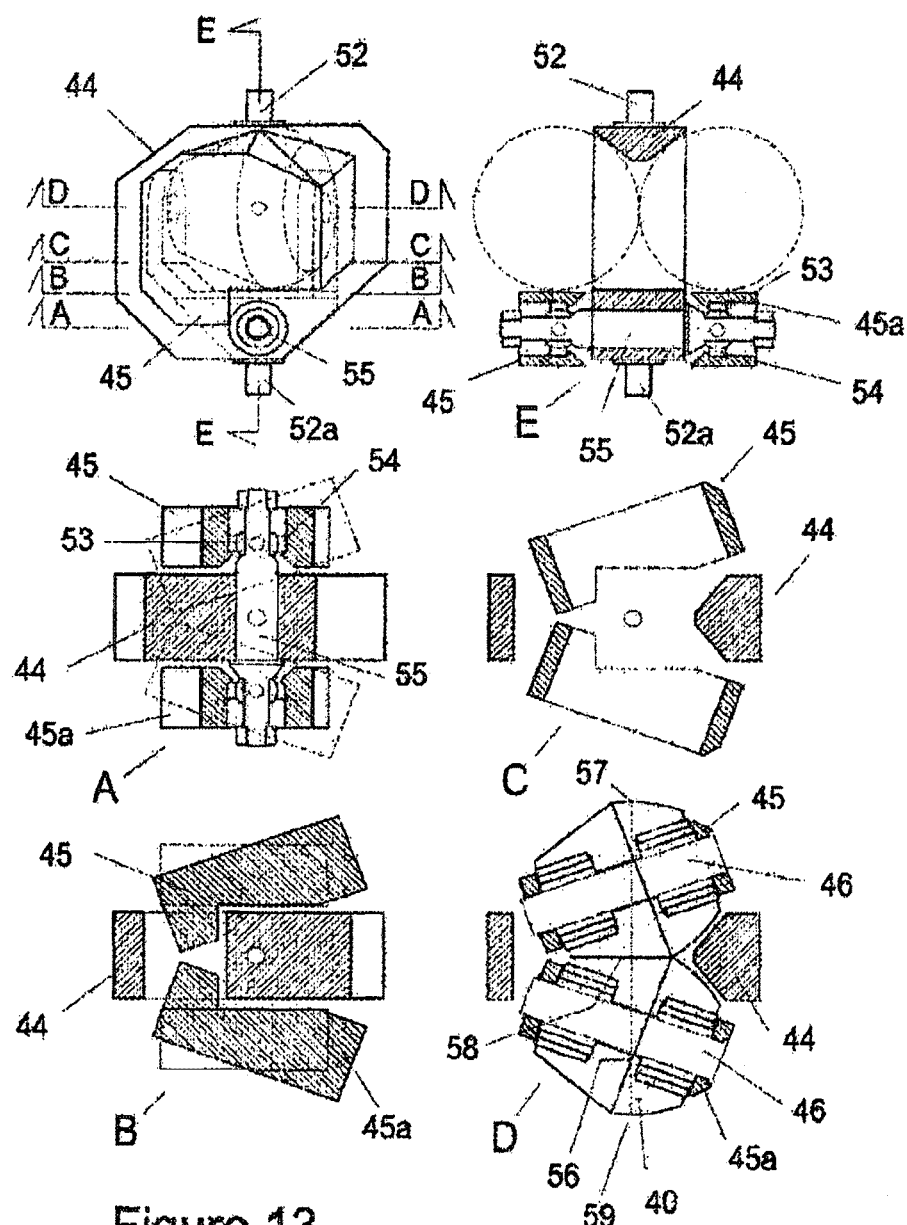
FIG. 13 shows views of a trunnion and double roller arrangement of the variator of FIG. 10.

A worm gear 47 is fixed to each trunnion 44 and meshes with a four-start worm 48 tubular in shape that passes from one toroidal cavity to the next creating a coaxial design with another tube 49 acting as a support for a plate that supports the trunnion axles 52 shown in FIGS. 12 and 13.

A roller and ramp system 50 acts to clamp the discs together when transferring torque supplied from the input shaft 51 transferred to the internal shaft 51a.

Torque is outputted from the disc 43 to a bell housing 52 to the output shaft 52a.

Figure 11:
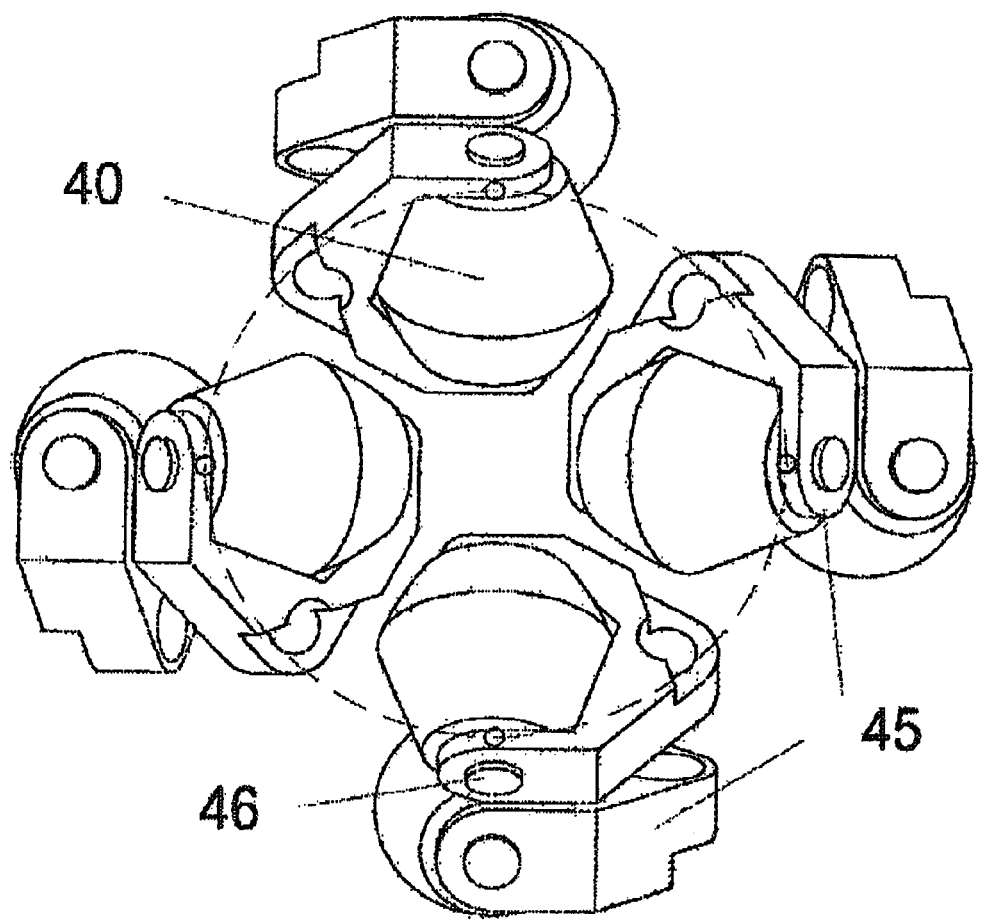
FIG. 11 is a plan view of the roller pair assemblies of the variator of FIG. 10.

FIG. 11 shows a plan view of the double rollers supported in their yokes 45 on axles 46. The trunnions are not shown. The rollers in this drawing are set in a position rotated so that they are outputting either high or low gear from the CVT.

FIG. 12 is a view of the trunnions 44 that are used to support the yokes (not shown) on ball joints fitted to shafts 55. The Trunnions are fixed in position on axles 52 which allow them to rotate on their axis. The disc supporting shaft 51a can be seen passing through the centre surrounded by the support tube 49 and the four start worm 48. The worm meshes with the worm gear 47 ensuring that all four trunnions 44 rotate synchronously.

FIG. 13 details the trunnion and yoke and ball joint associated with the DFTV shown in FIGS. 10, 11, and 12.

The plan view of the trunnion 44 is shown sectionalized in positions A-A, B-B, C-C, D-D, and E-E, The trunnion axles 52 and 52a project from either end and are supported within the body of the assembled CVT. The spherical bearing support 55 passes through the trunnion 44 to support both yokes 45.

Section E shows the relationship of the twin rollers to the trunnion 44 and its axles 52 and 52a. The spherical bearings 53 and their housing 54 are fixed into the yokes 45 and 45a

Section A passes through the same components and in the same position but from a different direction as Section E. The shape of the yokes 45 and 45a can be seen to incorporate one part generally aligning with the trunnion 44 and a forked part aligning with the roller axles.

Section B passes through the trunnion 44 and the two yokes 45 and 45a in a position where the yoke is solid and has not yet become the fork needed to support the roller.

Section C passes through the yokes where they are now a forked shape.

Section D passes through the centre of the rollers and shows the roller axles 46 and 46a which are fixed into the yokes 45 and 45a. The dotted line 56 represents the line of force that passes from one roller/disc contact 57 through the conical contact 58 to the other roller/disc contact 59.

It can be seen that when the trunnion 44 is rotated the twin rollers rotate about the line 56 one in one direction and the other the opposite, with the yoke swiveling on the spherical bearing. The axis of rotation of the rollers no longer passes through the rotational axis of the discs and the rollers begin to steer across the surface of the discs. Because both discs rotate in the same direction this causes one roller to steer across the input disc in one direction and the other to steer across the output disc in the other direction. The steering stops once the yokes have swiveled back sufficiently on the spherical bearing to allow the roller axis of rotation to pass through the rotational axis of the disc again.

The invention claimed is:

1. A toroidal variable speed traction drive comprising:
   a driving disc and a driven disc, said discs having a common axis of rotation, the inner face of each disc being formed with a negative shape of a toroid, such that inner faces of the discs define a toroidal cavity therebetween;
   a plurality of pairs of roller assemblies interposed between said discs, each roller assembly comprising a roller;
   wherein said discs are urged together against the interposed pairs of roller assemblies by a clamping force, wherein the rollers of each pair of roller assemblies are arranged to roll on each other with one roller contacting the driving disc at a first contact point and the other roller contacting the driven disc at a second contact point, wherein each roller assembly contacts each disc through a traction fluid at said first and second contact points, so that all the rotational force is transferred at said first and second contact points through said traction fluid;
   each roller assembly of each pair of roller assemblies being connected to a corresponding rotatable trunnion; each trunnion having a rotational axis which passes through the toroidal cavity;
   wherein by rotating each trunnion about its respective rotational axis each trunnion applies a steering force to its corresponding pair of roller assemblies at respective points relative to each roller assembly of the respective pair of roller assemblies;
   whereby the applied steering force causes the rollers of each corresponding pair of roller assemblies to rotate about a line that intersects the first and second contact points and to steer and adopt different first and second contact points with the discs;
   wherein each respective point at which the steering force is applied to each pair of roller assemblies is located offset from the corresponding trunnion rotational axis at a fixed distance and also is offset from the line which intersects the corresponding first and second contact points.

2. The toroidal variable speed traction drive according to claim 1, wherein each roller of each pair of roller assemblies is formed with a toroidal surface which contacts a corresponding one of the discs, and a conical surface, on which each pair of rollers contact each other.

3. The toroidal variable speed traction drive according to claim 2, wherein the connection between each roller assembly and a corresponding rotatable trunnion comprises a joint; wherein said joint defines a respective point at which the steering force is applied.

4. The toroidal variable speed traction drive according to claim 3, wherein all trunnions in said drive are constrained by a respective meshing gear attached to each respective trunnion, each meshing gear being located within the toroidal cavity, so that each trunnion rotates about its corresponding rotational axis by an equal angular amount, wherein the meshing gears are circular gears and each circular gear engages with a worm gear, whereby rotation of the worm gear causes the trunnions to rotate synchronously about their respective trunnion rotational axes.

5. The toroidal variable speed traction drive according to claim 1, wherein the connection between each roller assembly and a corresponding rotatable trunnion comprises a joint; wherein said joint defines a respective point at which the steering force is applied.

6. The toroidal variable speed traction drive according to claim 5, wherein said joint comprises a ball joint.

7. The toroidal variable speed traction drive of claim 6, wherein the ball joints of each pair of roller assemblies are interconnected and arranged on said rotatable trunnion, each ball joint engaging a cavity in the corresponding roller assembly.

8. The toroidal variable speed traction drive according to claim 1, wherein the clamping force is arranged to pass through a centre of the toroidal cavity.

9. The toroidal variable speed traction drive according to claim 1, wherein the trunnion rotational axis passes through the centre of the toroidal cavity and is tangential to a circle defining the centre of the toroidal cavity.

10. The toroidal variable speed traction drive according to claim 1, wherein all trunnions in said drive are constrained so as to rotate about their corresponding rotational axis by an equal angular amount.

11. The toroidal variable speed traction drive according to claim 1, wherein all the roller assemblies, trunnions and connections therebetween are disposed within the toroidal cavity.

* * * * *